United States Patent [19]
Isono

[11] 4,123,765
[45] Oct. 31, 1978

[54] AUTOMATIC FOCUS ADJUSTING DEVICE

[75] Inventor: Tadao Isono, Kokubunji, Japan

[73] Assignee: Nihon Beru-Haueru Kabushiki Kaisha, Higashimurayama, Japan

[21] Appl. No.: 789,477

[22] Filed: Apr. 21, 1977

[51] Int. Cl.² ............................................. G03B 13/18
[52] U.S. Cl. .................................. 354/25; 352/140; 250/201
[58] Field of Search .................. 354/25; 352/140; 250/201

[56] References Cited

U.S. PATENT DOCUMENTS

| 3,958,117 | 5/1976  | Stauffer   | 354/25 |
|-----------|---------|------------|--------|
| 4,021,821 | 5/1977  | Peterson   | 354/25 |
| 4,059,756 | 11/1977 | Wilwerding | 354/25 |
| 4,059,757 | 11/1977 | Wilwerding | 354/25 |
| 4,059,758 | 11/1977 | Wilwerding | 354/25 |

*Primary Examiner*—Russell E. Adams
*Attorney, Agent, or Firm*—John E. Peele, Jr.; Aaron Passman

[57] ABSTRACT

Disclosed is an improvement in an automatic focusing system for use with an optical instrument having a focusable objective which is adjustable in response to optical and electrical components of the system determining object distance of a remote subject by comparing images of scanning and reference optical systems. The scanner of the optical system is driven oscillatably across an angle to detect a subject between infinity and the minimum focus condition of the objective lens. The scanner is adjustable in response to the focus condition of the lens whereby the bisector of the angle is aligned with the subject.

10 Claims, 9 Drawing Figures

AUTOMATIC FOCUS ADJUSTING DEVICE

The present invention relates to improvements in an automatic focusing system for use with an optical instrument having a focusable objective. More particular, the improvement relates to controlling the scanning of an optical system of the focusing system and the relative position of the scanner to relate the orientation thereof to the focus condition of the lens.

Improvements are being made continuously to optical instruments such as cameras having a focusable objective lens. One of the more recent series of improvements is an automatic focusing system for adjusting focus of the lens to an object distance corresponding to the distance of the camera to a remote subject in the field of view of that lens. Typically, an automatic focusing system may use the principle of spatial image correlation wherein a scene imaged by a first auxiliary optical system is scanned by a sensor and the image therefrom is correlated electronically by another sensor with an image from another auxiliary optical system. Such an automatic focusing system has electronics for evaluating the light bundles from images passed through the optical systems and impinging on sensor arrays. The electronics control power to a motor for driving the focusing cell of an objective lens as the images through the optical systems are related one to another. Focus of the objective lens is considered to occur when the images from the optical systems are coincident and the position of the scanning optical system is related to the position of the objective lens.

Certain of the automatic focusing systems, as described in recently issued United States patents, can be mass produced, are not unduly complex, bulky, and expensive, and are reliable for use in optical instruments or cameras for the mass market. Such a system includes a scanning means which moves an optical axis to sweep an image across a light sensitive array, which is connected with another similar array of a distance detector. From the arrays, signals are fed to signal processing circuitry which determines electronically whether the images are non-coincident or coincident. The output of the signal processing circuitry is connected to a scanning sensor position detector and to a driver for adjusting the focus of the objective lens according to the position of the scanning sensor means when the images impinging on the arrays are coincident.

According to the present invention, the focusing system is improved by relating the orientation of the scanning system to the focus condition of the objective lens by an electrical or electro-optical position locator. Determination of the difference in orientation of the center of the scanner's sweep and of the focus condition of the objective lens is enabled by comparing the timing of pulses from each of the devices. Correlation of lens focus position and scanner position is determined when the time pulses are coincident. Further, the rate of sweep of the scanner is modified to cause the rate to be slowed in the vicinity of the center of the sweep at a relatively faster rate near the ends of the sweep which portion of the sweep is required for acquiring the approximate distance to the subject. Thereafter, the focus condition of the lens is adjusted, and the sweep aspect of the scanner is altered to cause the scanner to be centered on the subject with a higher degree of accuracy and fewer over-shoots than a constant high speed sweep.

An object of the present invention is to provide an improved correlation mechanism for enhancing the ability of the automatic focusing system to determine the object distance.

Another object is to provide a position locator for determining the position of the scanner of the automatic focusing system.

Yet another object of the invention is to provide means to correlate the position of the scanner and the object distance setting of the objective lens.

Still another object of the invention is to provide means to alter the rate of oscillation of the scanner so that the sweep through the central angle is at a slower rate than the sweep through the angles more remote from the center.

The above and other objects and advantages of the invention will become apparent from reference to the detailed specification and the accompanying drawings in which like numerals refer to like parts:

Figure 4:
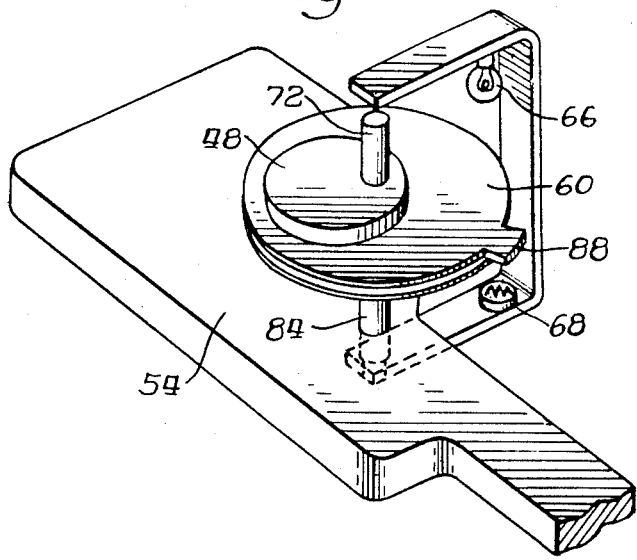
Figure 5:
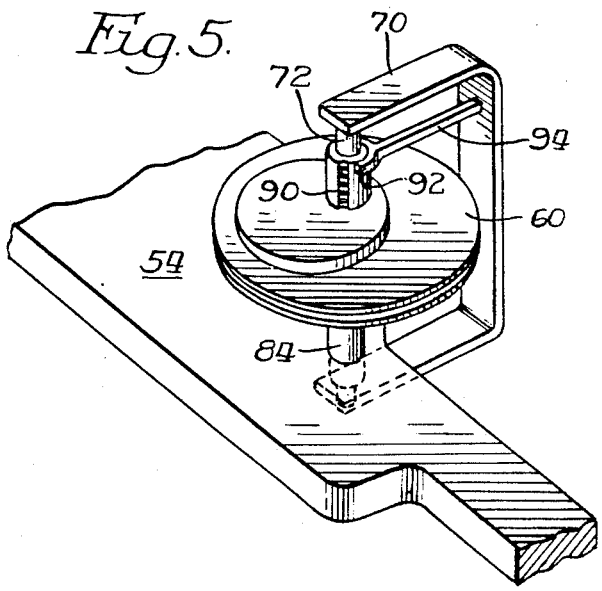
Figure 6:
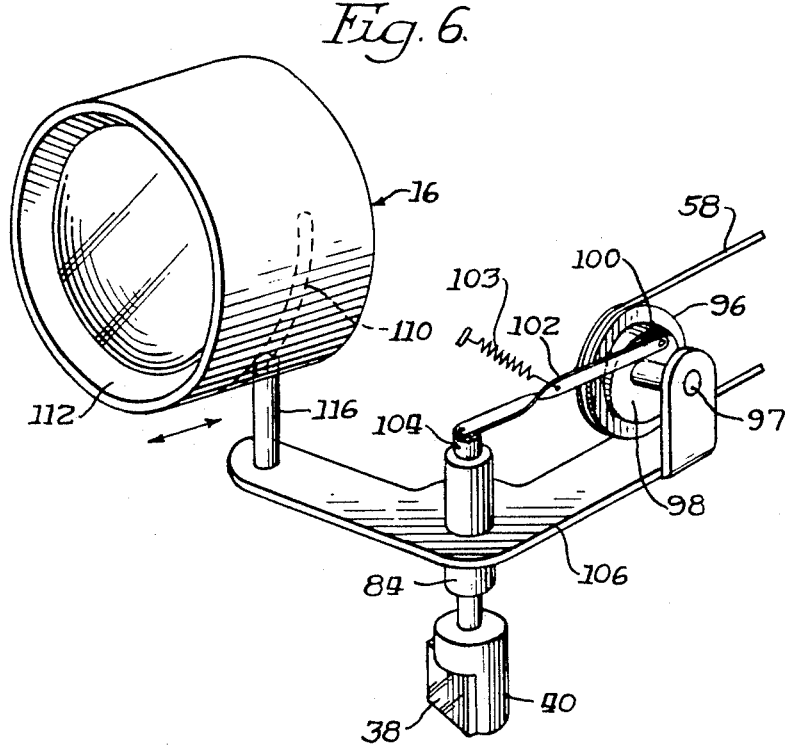
Figure 7:
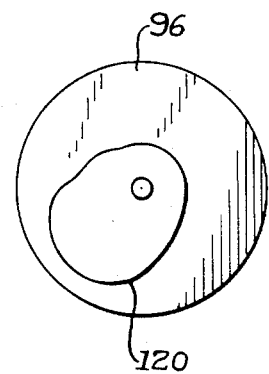
Figure 8:
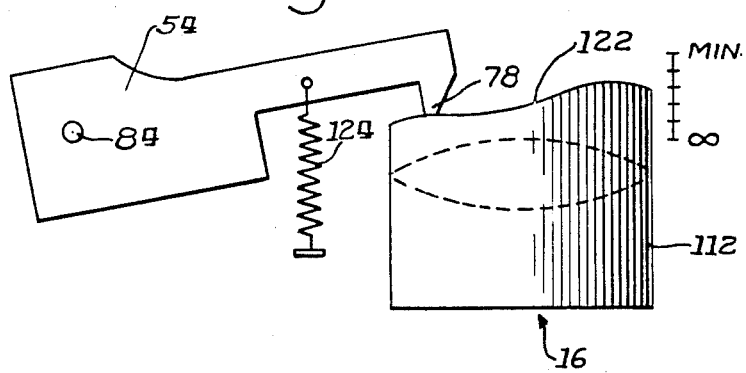

FIGS. 4, 5, and 6 are perspective views of other embodiments of a position locator mechanism;

FIG. 7 is an enlarged elevational view of a modified scanner drive cam and pulley;

FIG. 8 is an elevational view of a scan aspect adjusting mechanism; and

Figure 9:
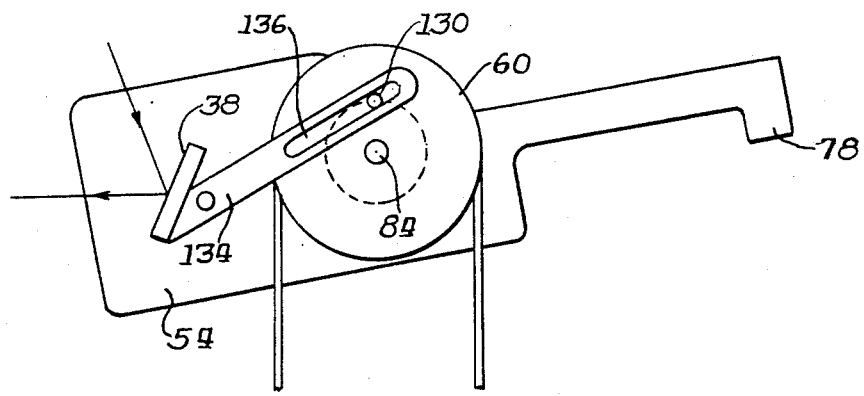

FIG. 9 is an enlarged elevational view of a scanner drive and aspect adjustment mechanism.

Figure 1:
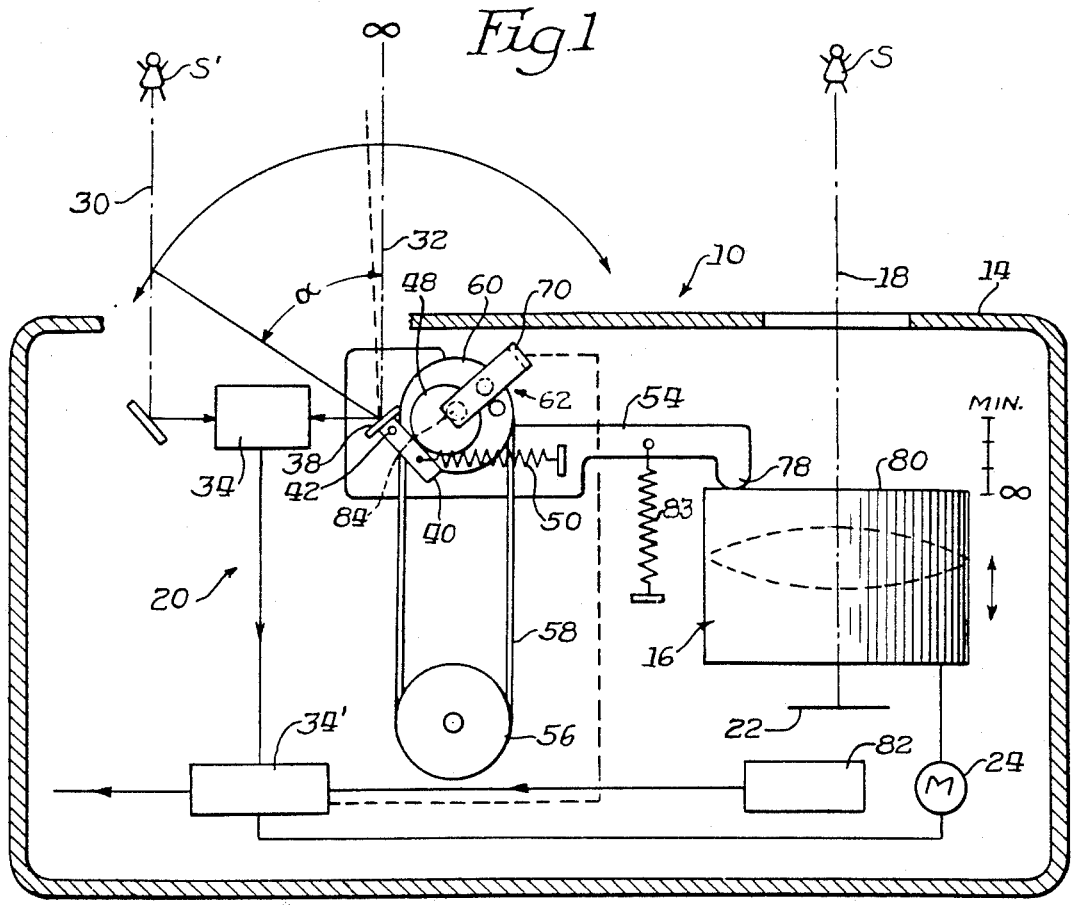
FIGS. 1 and 2 are schematic showings of a camera having an automatic focusing system for adjusting an objective lens with components in changed positions.

Referring now to FIG. 1, an optical instrument, such as a camera 10, is shown having a housing 14 which substantially encloses a focusable objective lens 16 defining an optical axis 18, and an automatic focusing system 20. The objective lens 16 or a focusing cell thereof is adjustable axially along the optical axis 18 for imaging of a remote subject S at given range of camera-to-subject or object distances onto an image plane 22 within the camera housing. The automatic focusing system is connected electrically to a drive motor 24 which is mechanically coupled to the objective lens so that the position of the objective lens is adjusted for focus at the object distance of the remote subject as determined by focusing system 20.

Optically, the automatic focusing system includes a pair of optical systems 30, 32 which image light rays of the remote subject on a detector 34. The first optical system is oriented parallel with the optical axis of the objective lens and functions to form on the detector a reference image of the subject S', which is the same as subject S. The second optical system 32 is arranged spaced from the first optical system, and includes a movable sensor or scanner shown as a mirror 38 which is movable to sweep the optical axis through an angle. The sweep of the angle extends from an orientation substantially parallel with but intersecting the optical axis of the first optical system at a substantial object distance, to an angle intersecting the optical axis of the first optical system at an object distance substantially comparable to the minimum focusing distance of the objective lens. When the scanner is oriented to correspond to the object distance at which the objective lens is set, the arc or aspect of the sweep is divided on both sides of a perpendicular to the surface of the scanner. As the scanner sweeps the field, the image of the second optical system 32 moves relative to the image of the first optical system 30. These optical systems image the light bundles on the light sensitive arrays of detector 34, and indicate focus when images from the respective optical systems impinge on the detector arrays in coincidence.

Through circuitry of the automatic focusing system 20, the motor 24 for driving the objective lens 16 is selectively energized to adjust the position of the objective lens toward and from the image plane 22. This movement enables the object distance setting to be altered to focus the image of the subject S on the image plane at various distances between infinity, a maximum focus condition and a minimum focus condition for the lens. Other circuitry controls energizing of a drive means (not shown) for the scanner. Still other circuitry determines the position of the scanner member 38 for correlation with the orientation of the objective lens 16.

More particularly, the movable scanner 38 is supported by the scanner holder 40 which is pivoted about an axis 42. The scanner holder 40 is moved in an oscillating manner by a driven cam 48 with which a portion of the holder is biassed into continuous engagement by a spring member 50, which is attached at its other end to a base lever member 54. Drive of the cam 48 is provided by a powered pulley 56 which is connected by a belt 58 to a pulley 60 to which the cam is either attached in a known manner or may be formed integrally. The powered pulley 56 is drivable by a not shown motor. The cam 48 is arranged eccentrically of the pulley to cause the movable scanner to sweep through an angle α during each revolution of the pulley 60. This scanning angle is larger than the field of view and range of focus of the objective lens 16, and will detect subjects across the range of focus so that the object distance can be determined. Since the scanning angle is double the possible object angle, the central axis or bisector which extends perpendicular to the scanner surface, the subject will be located even at the extreme opposite ends of the scanner path. The bisector of the scanning angle is aligned on subject when the scanner has acquired the object distance and caused adjustment of the objective lens to that distance.

To correlate the position of the scanner with an object distance, the pulley 60 is provided with a position indicator system 62 which enables a sensing system to relay information as to the position of the automatic refocusing system. In this embodiment, as shown in more detail in FIG. 3, the position indicator system 62 includes signal generator 64 shown as a hole formed in the pulley 60 for controlling the passage of light rays from an auxiliary light source 66 to a light sensitive receiver element 68. The light source 66 and the receiver element 68 are aligned relative to one another and fixed to a frame 70 in which is supported a shaft 72 about which the pulley 60 is rotated. The scanner holder 40, the pulley 60, and the bracket 70 are installed on the movable base lever 54 which is rotatable about an axle arranged coaxially with the axis around which the scanner support 40 moves. The position of the base lever 54 and the components supported thereon is determined by the position of the objective lens 16. A contact tip portion 78 of the base lever is biassed into engagement with a rim 80 of the objective lens by a spring member 83 fixed at its other end to the camera housing 14. As the objective lens is adjusted axially to an object distance for focusing of the image of a remote subject on the image plane 22, the rim 80 is adjusted in a corresponding manner. Through the contact member 78, the base lever rotates about an axis 84 thereby causing a change in the scanning aspect of the movable scanner. That is, the tip of the lever 54 is formed so that the scanner is perpendicular to the subject when in a position corresponding to the focused condition of the objective lens, and is in the middle of its scanning arc as driven by the cam 48. Therefore, for example, when the objective lens 16 is adjusted to an object distance focus of 5 meters, the scanner sweeps an angle of α degrees, respectively, in front of and behind the position of 5 meters.

A portion 34' of the automatic focusing detector circuitry is arranged to receive signals from the comparator sensors 62 and 82 and their interconnecting circuitry. As the control signals from the scanner are received, timing of these signals is compared with the lens position signal from circuit 82 to determine if the control signal is generated before or after the lens position signal. In response to the time error detected, the drive motor 24 for adjusting focus of the objective lens is energized in a direction as required until the signals coincide. Such signal coincidence indicates to the focusing system that the object distance setting of the objective lens 16 corresponds to the orientation of the optical axis 32 of the moving scanner when the sensing circuit 34 detects maximum image correspondence.

Figure 2:
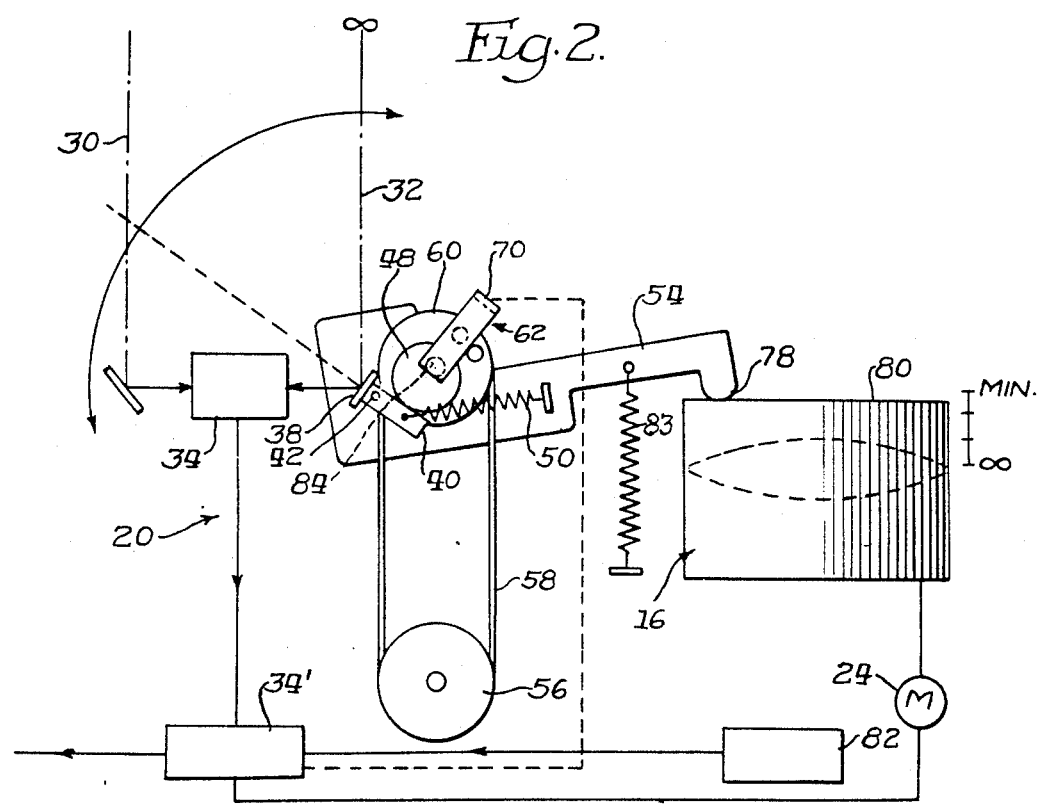

In FIG. 2, the movable base lever 54 is shown rotated about the axis 84 in a counter clockwise direction from the orientation of FIG. 1. The scanner 38, the pulley 60, and other components supported on the base lever 54 are adjusted toward a minimum object distance condition. The scanning arc of the scanner is seen to sweep cyclically through a predetermined angle, respectively to the front and to the rear of the position of the minimum focus distance.

Figure 3:
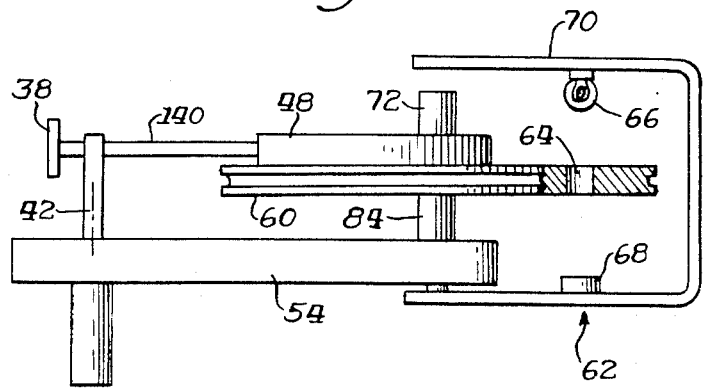
FIG. 3 is an elevational view of an embodiment of a position locator mechanism.

Referring again to FIG. 3, and the modifications of FIGS. 4 and 5, embodiments of position indicator systems for defining the relative scanning orientation of the movable scanner are shown. In FIG. 3, the base lever 54 supports the bracket 70 carrying the light source 66 and optical sensitive element 68 opposite to one another with the pulley 60 therebetween. The bracket 70 is movable about the axis 72 of the pulley. For each rotation of the pulley, pulses of light radiation from the light source 66 are permitted to impinge on the sensitive element 68 as the signal generator 64 of the pulley passes therebetween. The hole 64 is arranged with respect to the cam so that each signal or pulse of light radiation occurs when the movable scanner faces the position corresponding to the object distance setting of the objective lens 16. Correction of the relative positions of the components may be made by adjusting the positions of the bracket 70 about the axis 84. In FIG. 4, the position indicator 62 functions opposite to the manner described in FIG. 3. That is, the signal generator is a projection 88, formed on the pulley, to interrupt the light path from the light source 66 to the light receiver 68 for each rotation of the pulley. Further, in FIG. 5, the position indicator is an electric conductor 90 mounted on and rotatable with the pulley 60. As the pulley rotates, the conductor engages electric contacts 92 (one shown and the other blocked by the axle and not shown) which are installed on an arm 94 extending from the bracket 70.

Since the signal generator is fixed to the pulley, and the scanner drive cam is likewise fixed to the pulley, the orientation of the drive cam and therefore of the scanner is known. The scanner is "on-subject" at some condition of the cam. As the cam and the signal generator are relatively fixed together, the position of the scanner can be determined and translated into either electrical or other data output.

Another embodiment of the assembly for correlating focus of the objective lens 16 and the orientation of the movable mirror or scanner 38 is shown in FIG. 6. The movable scanner is driven to be scanned through the sweep angle by a pulley 96 driven by a belt 58 in the manner as previously described so as to rotate the pulley about an axis 97. Connected to the pulley 96 is a surface cam 98 against which a cam follower 100 of an oscillatable link 102 is biassed by a spring 103. The cam follower engages the cam spaced from the axis 97 about which the pulley 96 rotates. The other end of this link 102 is connected slightly off center to an axle 104 about which the scanner 38 oscillates as the pulley rotates. As the cam rotates, the link causes arcuate oscillation of the scanner in response to the high and low portions of the cam 98. The base lever or table 106 is mounted to pivot about an axis 84 corresponding to the axle 104 as the objective lens is adjusted to various focus conditions. In this embodiment, the lens focus condition is translated by a reference cam 110, peripheral of the lens barrel 112 and a cam follower formed as a pin 116 fixed to the table 106. As the focus of the objective lens changes, the scanning aspect of the movable scanner is altered responsively. Although the base lever or table is shown as being extended to support the pulley, the table can be formed of two pieces whereby the arm on which the pulley is mounted may be fixed, while the cam follower supporting arm can move as required due to the effective movement of the focusing component of the objective lens.

A modified embodiment of the scanner driving cam 120 is shown in FIG. 7. This cam is designed to cause the movable scanner 38 to sweep the scene more slowly when the scanner faces the position corresponding to the object distance of the objective lens 16. That is, the scanner is driven to oscillate from end to end of the sweep in a predetermined period of time. With the cam configuration as earlier described, the time for movement through comparable angles at either the beginning, middle or the end of the sweep angle is the same. However, in this embodiment, the time for movement is altered whereby the time of sweep movement through a middle angle is greater than the time of comparable movement through comparable angles closer to the ends of the sweep. The specific configuration of the cam may be designed according to the rate of rotation of the pulley and the sweep angle of the scanner. The cams as described hereinbefore may be modified for the function as mentioned herein.

Referring next to FIG. 8, the rim 122 on the barrel 112 of the lens 16 is formed as a cam against which the cam follower tip 78 of the movable base lever 54 engages. A biassing means 124 maintains engagement of the follower tip against the focus comdition reference rim. The cam rim functions to adjust the movement of the movable base lever about the axis 84 to correspond with the movement of the objective lens, but at a rate not necessarily proportional to the movement of the lens. The objective lens or a focusing component thereof is moved axially for adjusting the object distance between near and far settings. However, an improvement in focusing accuracy can be obtained by causing the base lever to pivot at a greater rate at the far end of the focus setting range so as to amplify those movements. Further, the cam can cause the movable base lever to move uniformly as the objective lens is focused.

In FIG. 9, another embodiment of the scanner drive system is shown. In this embodiment, a pin 130 is mounted on the pulley 60 away from the axis 84 about which the pulley is rotated. The movable sensor scanner 38 is supported on a holder 134 which is movable pivotably about an axis 42 by which the holder is fixed to the base lever 54. Along a length of the holder 134, an elongated groove 136 is provided to receive the pin 130 carried by the pulleys. As the pin is rotated in the dotted line path, the scanner is caused to scan the scene in response to rotation of the pulley whereby the pin causes the slotted end 136 of the holder 134 to move through a path from a maximum to one side of the axis 84 to a maximum on the opposite side of the axis. Due to the effective leverage as the holder moves across the middle of its scan and toward either maximum, the holder traverses the central portion of the movement path slower than the ends of the path. As described in FIG. 7 with respect to the altered cam, the ability to sense the scene and adjust the objective lens and the scanner axis to an in-focus condition is therefore improved. This occurs since the scanning rate of the scanner is slowed in the object distance area at which the subject should be located.

In summary, mechanisms have been described for improving the accuracy of automatic focusing systems for use in adjusting the focus of the objective lens of a camera. The system is based on comparing the images from two optical systems, one of which is scanned across the scene to be photographed. The scanner is mounted on a movable base member for movement responsive to the focus condition of the objective lens so as to alter the scanning aspect of the scanner. When the scanner sweeps across the middle of its scanning track, the scanner faces the position corresponding to the object distance. Orientation of the scanner is translated to the focusing system by a lens position signal which is generated by a position indicator device. Further, to enhance the ability of the focusing system to detect the focus condition, the scanner is caused to sweep across an angle in which the subject should be located at a slower rate than is the sweep through angles near the ends of the sweep track.

What is claimed is:

1. For an optical instrument having a focusable objective lens, and an automatic focusing system including a scanner optical system having a scanner means and a reference optical system wherein images of a remote subject are caused respectively to impinge on a detector means, the detector means generating an output signal representing the object distance of the subject when the images on the detector are coincident, and including means to adjust the focus of the objective lens to the object distance, the improvement in a means to relate the orientation of the scanner and the focus condition of the objective lens comprising:
   reference means on said objective lens adjustable in response to variations in focus condition of said lens,
   scanner driver means for driving said scanner means about an axis oscillatably through a predetermined angle,
   means supporting the scanner means for arcuate movement of the axis thereof, and
   means on said scanner supporting means for engagement with said objective lens focus condition reference means for arcuate positioning of said supporting means, whereby the central alignment of said predetermined angle through which said scanner moves corresponds to the focus condition of said objective lens.

2. An improvement as in claim 1 including signal generator means related fixedly to said scanner driver means and correlated with said scanner means whereby the position of said scanner is related electrically to said detector means.

3. An improvement as in claim 2 including means generating a lens position signal responsive to the focus condition of said objective lens and autofocusing circuit means comparing the timing of said position signals with output signals of said detector means for correlating the orientations of said objective lens and of the subject.

4. An improvement as in claim 2 wherein said signal generator means includes a radiation source, a radiation receiver, and means driven cyclically by said scanner driver for generating a pulse with each cycle of said scanner driver, whereby the orientation of said scanner can be determined during the sweep of the scanner through the predetermined angle.

5. An improvement as in claim 1 wherein said scanner driver causes oscillation of said scanner means at a varying rate responsive to orientation of said scanner in the predetermined angle through which said scanner means is oscillated.

6. An improvement as in claim 5 wherein said scanner driver drives said scanner means more slowly through the center of said predetermined angle than nearer the ends of said predetermined angle during a cycle of determined duration.

7. An improvement as in claim 6 wherein said scanner driver is a cam configured to drive said scanner means at a variable rate, and means biassing said scanner means against said cam whereby said scanner means is oscillated at a variable rate.

8. An improvement as in claim 1 wherein said focus condition reference means of said objective lens is configured to translate the focus condition at a predetermined ratio with respect to movement of the focusing member of said lens.

9. An improvement as in claim 1 wherein scanner means is oscillated through a predetermined angle greater than the full range of focus of the objective lens, and said scanner supporting means adjusts said scanner means to sweep across all of said full range with said central portion of said angle substantially aligned with said object distance.

10. An improvement as in claim 9 wherein said scanner means is oscillated through a predetermined angle double the angle between infinity and the nearest angle corresponding to minimum focus of the objective lens.

* * * * *

UNITED STATES PATENT OFFICE
CERTIFICATE OF CORRECTION

PATENT NO. : 4,123,765
DATED : October 31, 1978
INVENTOR(S) : Tadao ISONO

It is certified that error appears in the above-identified patent and that said Letters Patent are hereby corrected as shown below:

Page 1, column 1, line 7, insert

--[30]   Foreign Application Priority Data
    Apr. 23, 1976 [JP]   Japan.......... 51-46395   --.

Signed and Sealed this

Tenth Day of July 1979

[SEAL]

Attest:

Attesting Officer

LUTRELLE F. PARKER
Acting Commissioner of Patents and Trademarks